United States Patent Office 2,943,120
Patented June 28, 1960

2,943,120
DEALKYLATION OF ALKYL-SUBSTITUTED NAPHTHALENES

Jack Ryer, South Wappingers Falls, Marc F. Fontaine, Fishkill, and Howard V. Hess, Glenham, N.Y., assignors to Texaco Inc., a corporation of Delaware No Drawing. Filed Dec. 23, 1957, Ser. No. 704,304

4 Claims. (Cl. 260—672)

This invention relates to the dealkylation of alkyl-substituted naphthalenes. More particularly, it relates to the production of naphthalene by the demethylation of methyl-substituted naphthalenes.

It is well known to those skilled in the art that several processes are available for the dealkylation of alkyl-substituted naphthalenes in which the alkyl groups contain two or more carbon atoms. However, these processes are to a large extent unsatisfactory for the removal of alkyl groups containing a single carbon atom or in other words, methyl groups from methyl-substituted naphthalenes. Apparently an aromatic ring having a methyl substituent has a much more stable configuration than does an aromatic ring having a side chain of two or more carbon atoms. In fact, in some of the known processes the dealkylation of alkyl-substituted naphthalenes proceeds only to the extent that alkyl groups containing two or more carbon atoms are reduced to methyl groups.

It has now been found that alkyl-substituted naphthalenes, and particularly methyl-substituted naphthalenes can be converted to naphthalene by contacting the alkyl-substituted naphthalene or methyl-substituted naphthalene in the presence of hydrogen with a zinc oxide-zinc chromite catalyst.

According to the process of the present invention, the alkyl-substituted naphthalene is contacted at elevated temperatures and pressures and in the presence of hydrogen with a catalyst comprising zinc oxide and zinc chromite.

The catalyst used in the process of the present invention contains two components, namely, zinc oxide and zinc chromite, the zinc oxide being present in amounts ranging from 10 to 90% based on the combined weights of the zinc oxide and zinc chromite. The zinc oxide-zinc chromite catalyst may be used alone or may be deposited on a substantially inert base such as alumina or magnesia. Catalysts containing 25 to 75% zinc oxide based on the combined weights of the zinc oxide and zinc chromite are preferred.

The catalyst may be prepared according to the following method in which parts are given by weight. A first solution is prepared by dissolving 3.036 parts of C.P. ammonium dichromate in 10 parts of water and adding 2.4 parts of concentrated ammonium hydroxide in 4 parts of water. A second solution is prepared by dissolving 7.134 parts of C.P. $Zn(NO_3)_2 \cdot 6H_2O$ in 16 parts of water. The first and second solutions are then mixed by being added slowly and simultaneously at equal rates with good agitation to a vessel containing 4 parts of water. Stirring is continued for ½ hour after the addition is complete and then 6 parts concentrated ammonium hydroxide is added to insure complete precipitation.

The precipitate is filtered and washed three times with 10 parts of water, dried and the dried powder decomposed in small portions by heating to incipient decomposition temperature. The decomposition temperature was found to be about 640° F. The decomposed powder is then sieved through 20 mesh, pelleted in 5/32 inch dies with 2% Sterotex (a hydrogenated vegetable fat) and calcined at 750° F. for 12 hours. 2.85 parts of dark brown pellets are obtained.

The resultant catalyst contains 26% zinc oxide and 74% zinc chromite by weight. The composition of the catalyst may be varied using appropriate amounts of ammonium dichromate and zinc nitrate as the starting materials.

When the catalyst is intended for use in a fluidized system the decomposed powder is ground to a particle size of less than 200 microns in diameter with a major proportion between 20 and 80 microns.

The process of the invention is applicable to feed stocks containing alkyl naphthalenes or mixtures of alkyl naphthalenes. Various refinery stocks such as thermal cracked gas oil streams and aromatic extracts thereof, fluid cracked streams including fluid cracked distillate and cycle gas oils and aromatic extracts thereof, reformer bottoms and tar stripper bottoms may be satisfactorily treated by the process of the present invention.

The temperatures utilized can vary between 800 and 1400° F. In practice it is preferable to operate at temperatures between about 950° and 1150° F.

Pressures may range from 50 to 5000 p.s.i.g., a preferred range being from 100 to 100 p.s.i.g. The liquid hourly space velocity, that is, volumes of feed per volume of catalyst per hour may range from 0.1 to 10. Satisfactory results have been obtained using space velocities of 0.2 to 5 v./v./hr.

The dealkylation reaction of the present invention is effected in the presence of a gas containing hydrogen. In practice, gases containing 83% hydrogen have been found to be satisfactory although gases containing 70 volume percent hydrogen may be used. The hydrogen containing gas may be recycled at a rate of 100 to 15,000 cu. ft. per bbl. of feed. Recycle rates of 1000 to 10,000 cu. ft. per bbl. of feed are preferred. Fresh hydrogen is added to the recycle gas as required to maintain the desired hydrogen concentration in the recycle gas. Suitable sources of hydrogen are reformer hydrogen, electrolytic hydrogen and the like.

In a preferred embodiment of the invention the alkyl-substituted naphthalene-containing feed stock is introduced into a reactor containing a fixed bed of zinc oxide-zinc chromite catalyst supported on alumina at a temperature of about 1025° F., a pressure of 500 p.s.i.g. and a space velocity of 0.5 v./v./hr. and a hydrogen containing gas rate of about 8000 s.c.f. per bbl. The effluent from the reaction chamber is introduced into a high pressure separator where the normally gaseous materials are removed and recycled to the reaction chamber. To prevent the buildup of light hydrocarbon gases in the recycle gas stream, a portion of this stream is bled from the system and makeup hydrogen is introduced into the recycle gas stream to replace the bleed stream. The bottoms from the high pressure separator are fractionated to recover the fraction boiling in the 210 to 245° C. range. This fraction is cooled to room temperature and filtered. The solid material recovered from the filtration is then pulped with a solvent and refiltered. Suitable solvents are methanol-water, ethanol-water, acetone-water and the like. The solid material recovered from the second filtration is naphthalene of high purity. The filtrate from the first filtration may be recycled directly to the reaction zone. Before recycling the filtrate from the second filtration to the reaction zone, water and alcohol should be removed.

The following examples are for illustrative purposes only.

Example 1

A hydrocarbon mixture essentially free of naphthalene and containing 53.4 weight percent α-methylnaphthalene and 37.5 weight percent β-methylnaphthalene is passed over a supported zinc oxide-zinc chromite catalyst containing 5.2% zinc oxide, 14.8% zinc chromite and 80% alumina under the following conditions:

| | |
|---|---|
| Temperature °F | 1025 |
| Pressure p.s.i.g. | 500 |
| Space velocity v./v./hr. | 0.5 |
| Gas recycle rate s.c.f./bbl. | 8000 |
| Hydrogen input s.c.f./bbl. | 1272 |

The liquid product amounts to 92.3 weight percent of the charge and contains the following:

| | Wt. percent |
|---|---|
| Naphthalene | 47.0 |
| α-Methylnaphthalene | 11.5 |
| β-Methylnaphthalene | 29.9 |

*Example II*

A hydrocarbon mixture containing 23.5% naphthalene, 31.0% α-methylnaphthalene and 37.2% β-methylnaphthalene is diluted with an equal volume of toluene and passed over a zinc oxide-zinc chromite catalyst supported on alumina and containing 12.3% zinc oxide, 7.7% zinc chromite and 80% alumina, under the following conditions:

| | |
|---|---|
| Temperature | 1075° F. |
| Pressure | 500 p.s.i.g. |
| Space velocity | 0.5 v./v./hr. basis total liquid feed. |
| Gas recycle rate | 6000 s.c.f./bbl. |
| Hydrogen input | 2400 s.c.f./bbl. |

A fraction boiling in the range of 210 to 245° C. is recovered from the reaction product and amounts to 80.6 weight percent basis the bicyclic content of the charge. This fraction is cooled to room temperature and filtered. The filtrate which amounts to 23.0 weight percent basis bicyclic feed contains 28.6% naphthalene, 15.6% α-methylnaphthalene and 45.3% β-methylnaphthalene. The solid which amounts to 57.6 weight percent basis bicyclic charge contains 90.3% naphthalene, 3.7% α-methylnaphthalene and 7.0% β-methylnaphthalene. The solid is washed with methyl alcohol containing 10% water and filtered. The solid recovered from this second filtration has a melting point of 78–79.5° C. and is essentially pure naphthalene.

Obviously many modifications and variations of the invention, as hereinbefore set forth, may be made without departing from the spirit and scope thereof, and therefore only such limitations should be imposed as are indicated in the appended claims.

We claim:

1. A process for the dealkylation of an alkyl-substituted naphthalene which comprises contacting an alkyl-substituted naphthalene with a catalyst consisting essentially of zinc oxide and zinc chromite and containing between 10 and 90% zinc oxide based on the combined weights of zinc oxide and zinc chromite at a temperature between 950 and 1150° F. and a pressure between about 50 and 5000 p.s.i.g. in the presence of added hydrogen.

2. A process for the demethylation of a methyl-substituted naphthalene which comprises contacting a methyl-substituted naphthalene with a catalyst consisting essentially of zinc oxide and zinc chromite supported on alumina, the ratio of zinc oxide to zinc chromite being within the range of 1:3 to 3:1 by weight at a temperature between about 1025 and 1075° F. and a pressure between about 100 and 1000 p.s.i.g. in the presence of added hydrogen.

3. A process for the demethylation of a methyl-substituted naphthalene which comprises contacting a methyl-substituted naphthalene with a catalyst consisting essentially of zinc oxide and zinc chromite supported on alumina, the ratio of zinc oxide to zinc chromite being within the range of 1:3 to 3:1 by weight at a temperature between about 1025 and 1075° F. and a pressure between about 100 and 1000 p.s.i.g. in the presence of added hydrogen, said catalyst having been prepared by dissolving ammonium dichromate in aqueous ammoniacal solution to form a first solution, dissolving zinc nitrate in water to form a second solution, mixing said first and second solutions with agitation, recovering the precipitate formed by said mixing, washing and drying said precipitate and heating the dried precipitate to decompose same.

4. A process for the production of naphthalene which comprises contacting a methyl-substituted naphthalene with a catalyst consisting essentially of zinc oxide and zinc chromite supported on an alumina base, the ratio of zinc oxide to zinc chromite being in the range of about 3:1 to 1:3 by weight at a temperature between about 950 and 1150° F., a space velocity between 0.1 and 10 v./v./hr., a pressure between about 100 and 1000 p.s.i.g. in the presence of hydrogen, fractionating the reaction product to produce a fraction boiling between about 210 and 245° C., cooling said fraction to room temperature, filtering said fraction to recover a solid therefrom, washing said solid with aqueous methyl alcohol and removing the aqueous methyl alcohol together with dissolved impurities from said solid.

References Cited in the file of this patent

UNITED STATES PATENTS

| 2,700,638 | Friedman | Jan. 25, 1955 |
| 2,774,801 | Coonradt et al. | Dec. 11, 1956 |

OTHER REFERENCES

Natta: Proc. Intern. Symposium Reactivity of Solids, Gothenburg, 1952 (619–632); abstracted in Chem. Abs., vol. 48, 1954, p. 11895g.

Bhattachraryya et al.: Jour. Sci. Ind. Res. (India), vol. 11B, pp. 550–1; abstracted in Chem. Abs., vol. 47, p. 8941f (1953).